United States Patent
Kuriki et al.

(10) Patent No.: US 6,850,537 B2
(45) Date of Patent: Feb. 1, 2005

(54) PACKET FLUCTUATION ABSORBING METHOD AND APPARATUS

(75) Inventors: Kouji Kuriki, Fukuoka (JP); Tomoyuki Uekado, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 09/812,418

(22) Filed: Mar. 20, 2001

(65) Prior Publication Data

US 2002/0027879 A1 Mar. 7, 2002

(30) Foreign Application Priority Data

Aug. 10, 2000 (JP) ........................................ 2000-243333

(51) Int. Cl.$^7$ .............................................. H04L 12/54
(52) U.S. Cl. ...................... 370/429; 370/428; 370/235; 370/412
(58) Field of Search ............................... 370/429, 428, 370/235, 412, 352, 252, 253, 411, 394, 395.1, 395.62, 395.21, 468, 336, 349, 350, 518, 519; 375/372, 373, 374

(56) References Cited

U.S. PATENT DOCUMENTS

| | | | |
|---|---|---|---|
| 5,148,429 A | * | 9/1992 | Kudo et al. .................. 370/473 |
| 5,184,347 A | * | 2/1993 | Farwell et al. ............... 370/350 |
| 5,195,091 A | * | 3/1993 | Farwell et al. ............... 370/336 |
| 5,297,139 A | * | 3/1994 | Okura et al. ................. 370/428 |
| 5,412,642 A | * | 5/1995 | Nunokawa .................... 370/253 |
| 5,619,341 A | * | 4/1997 | Auyeung et al. ............. 358/404 |
| 5,677,969 A | * | 10/1997 | Auyeung et al. ............. 382/239 |
| 5,777,985 A | * | 7/1998 | Nakayama ................. 370/395.62 |
| 5,818,818 A | * | 10/1998 | Soumiya et al. ............. 370/252 |
| 5,914,954 A | * | 6/1999 | Nakayama .................... 370/394 |
| 6,741,601 B1 | * | 5/2004 | Tanimura ....................... 370/412 |

FOREIGN PATENT DOCUMENTS

JP 61156949 7/1986

* cited by examiner

Primary Examiner—Wellington Chin
Assistant Examiner—Chuong Ho
(74) Attorney, Agent, or Firm—Katten Muchin Zavis Rosenman

(57) ABSTRACT

In a packet fluctuation absorbing method and apparatus of the present invention, packets from a preceding node of a network are received. The packets are temporarily retained in a buffer. The respective packets are read from the buffer in the order of receiving of the packets at given time instants. The read packets are output to a following node of the network so as to absorb time-related fluctuations of the packets. A lower limit of the buffer that is predetermined as being larger than zero is stored. When the number of retained packets in the buffer is less than the stored lower limit as a result of the outputting of one of the read packets and a use count of the corresponding one of the read packets is equal to or larger than a predetermined use count upper limit, the corresponding packet in the retained packets of the buffer is discarded.

10 Claims, 13 Drawing Sheets

PACKET FLUCTUATION ABSORBING METHOD AND APPARATUS

BACKGROUND OF THE INVENTION

1. Field of the Invention

The present invention relates to a packet fluctuation absorbing method and apparatus that is provided to absorb time-related fluctuations of packets at each node due to delays in the network.

2. Description of the Related Art

Generally, circuit switching was designed to provide an efficient and high-quality facility for voice traffic, and packet switching was designed to provide a more efficient facility than circuit switching for bursty data traffic. The packet switching technique is often taken as being unsuitable for voice or video data that require the continuous transmission. When packets of voice or video data are continuously transmitted across a network from node to node, the incoming packets are normally queued to each node by the first-in first-out (FIFO) scheme, and time-related fluctuations of the packets are liable to occur due to delays in the network. For this reason, it is necessary that the receiving node absorb the packet fluctuations and recover the original data from the received packets as the continuous data.

The absorption of packet fluctuations is carried out by including a fluctuation absorbing buffer in a communication system. In a continuous communication, if the data transmission starts, the reproduction of data is subsequently performed at intervals of a given time. It is important to determine when the reproduction is to be started after the first packet reaches the fluctuation absorbing buffer. In addition, it is important to determine how to control the fluctuation absorbing buffer when the overflow or the underflow of the buffer takes place.

In a conventional method of absorption of packet fluctuations using the fluctuation absorbing buffer, when the amount of packets in the buffer exceeds the upper limit (or the overflow), some of the received packets are discarded. The sequence of the data reproduction of the receiving node must be rearranged for the discarded packets. According to the conventional method, in a case of the underflow in which the amount of packets in the buffer is less than the lower limit, a dummy packet (an invalid packet or a previously received packet) is inserted to the received packets so as to suitably control the timing of the data reproduction, and the data reproduction of the receiving node is performed. In a case of the overflow of the buffer, the older ones of the received packets of the buffer are discarded and the newer ones are retained in the buffer so as to suitably control the timing of the data reproduction, and the data reproduction of the receiving node is performed.

FIG. 1 shows a conventional packet fluctuation absorbing apparatus that uses a fluctuation absorbing buffer (FIFO).

As shown in FIG. 1, in the conventional packet fluctuation absorbing apparatus, a packet input unit 10 receives packets from a preceding node (not shown) of the network or the source (not shown), and sends the received packets to a fluctuation absorbing buffer (FIFO) 12. The packet input unit 10 informs an input packet amount monitoring unit (IPAM) 14 of the number of the incoming packets to the buffer 12. The number of the incoming packets will be called the IP number.

When the information from the packet input unit 10 is received, the IPAM 14 retrieves the number of packets retained in the buffer 12 (which will be called the RP number) from the buffer 12. The IPAM 14 informs an input packet state determining unit (IPSD) 16 of both the IP number and the RP number.

When the information from the IPAM 14 is received, the IPSD 16 determines whether the overflow of the buffer 12 takes place as a result of the inputting of the received packets to the buffer 12, based on the IP number and the RP number. Namely, it is determined whether a sum of the previously retained packets (the RP number) and the incoming packets (the IP number) is above the upper limit of the buffer 12. When the overflow does not take place, the IPSD 16 initiates an input buffer processing unit (IBP) 18. When the overflow takes place, the IPSD 16 initiates an overflow processing unit (OFP) 20.

The IBP 18 writes the incoming packets to the buffer 12 so that the buffer 12 stores the incoming packets in addition to the previously retained packets. The OFP 20 informs a packet discarding unit (PDU) 22 of the number of packets being discarded (which will be called the DP number) by taking account of the excess of the sum of the previously retained packets and the incoming packets over the upper limit of the buffer 12.

When the information from the OFP 20 is received, the PDU 22 discards the excessive packets in the packets on the input side of the buffer 12 by the DP number.

In the conventional apparatus of FIG. 1, a packet output unit 24 reads the outgoing packets from the buffer 12 at intervals of a given time and sends the outgoing packets to a following node (not shown) of the network. The packet output unit 24 informs an output packet amount monitoring unit (OPAM) 26 of the number of the outgoing packets (which will be called the OP number) from the buffer 12.

When the information from the packet output unit 24 is received, the OPAM 26 retrieves the number of packets retained in the buffer 12 (the RP number) from the buffer 12. The OPAM 26 informs an output buffer state determining unit (OBSD) 28 of both the OP number and the RP number.

When the information from the OPAM 26 is received, the OBSD 28 determines whether the underflow of the buffer 12 takes place as a result of the outputting of the outgoing packets from the buffer 12, based on the OP number and the RP number. Namely, it is determined whether a difference between the previously retained packets (the RP number) and the outgoing packets (the OP number) is below the lower limit of the buffer 12. When the underflow does not take place, the OBSD 28 initiates an output buffer processing unit (OBP) 30. When the underflow takes place, the OBSD 28 initiates an underflow processing unit (UFP) 32.

The OBP 30 reads out the outgoing packets from the buffer 12 and passes the outgoing packets on to the packet output unit 24. The OBP 30 causes the PDU 22 to discard the outgoing packets in the packets on the output side of the buffer 12. On the other hand, the UFP 32 inhibits the PDU 22 from discarding the outgoing packets in the packets on the output side of the buffer 12.

In the conventional method described above, when the underflow of the fluctuation absorbing buffer is caused by delays in the network, dummy packets are inserted to the received packets so as to suitably control the timing of the data reproduction. If the dummy packets that continuously follow after the occurrence of the underflow are inserted, the timing of the data reproduction is significantly shifted from the original reproduction timing, and the difference between the incoming packets and the outgoing packets at the receiving node will be increased. In a case of voice communications, the conventional method is liable to deterioration of the quality of the reproduced voice at the receiver, which will cause the difficulty in hearing the reproduced voice at the receiver.

When the overflow of the fluctuation absorbing buffer is caused, the older ones of the received packets within the buffer are discarded and the newer ones are retained in the buffer so as to suitably control the timing of the data reproduction. The discarded packets are no longer recovered. In a case of voice communications, the conventional method is liable to deterioration of the quality of the reproduced voice at the receiver.

SUMMARY OF THE INVENTION

Accordingly, it is an object of the present invention to provide an improved packet fluctuation absorbing method and apparatus in which the above-described problems are eliminated.

Another object of the present invention is to provide a packet fluctuation absorbing method that effectively absorbs fluctuations of packets at the time of the reproduction and provides good quality of the reproduced data at the receiver.

Another object of the present invention is to provide a packet fluctuation absorbing apparatus that effectively absorbs fluctuations of packets at the time of the reproduction and provides good quality of the reproduced data at the receiver.

The above-mentioned objects of the present invention are achieved by a packet fluctuation absorbing method comprising the steps of: receiving packets from a preceding node of a network; temporarily retaining the packets in a buffer; reading the respective packets from the buffer, in the order of receiving of the packets, at given time instants; outputting the read packets to a following node of the network so as to absorb time-related fluctuations of the packets; storing a lower limit of the buffer that is predetermined as being larger than zero; and discarding, when the number of retained packets in the buffer is less than the stored lower limit as a result of the outputting of one of the read packets and a use count of the corresponding one of the read packets is equal to or larger than a predetermined use count upper limit, the corresponding packet in the retained packets of the buffer.

The above-mentioned objects of the present invention are achieved by a packet fluctuation absorbing apparatus comprising: a packet input unit which receives packets from a preceding node of a network; a buffer which temporarily retains the received packets; a packet output unit which reads the respective packets from the buffer, in the order of receiving of the packets, at given time instants, and outputs the read packets to a following node of the network so as to absorb time-related fluctuations of the packets; a lower limit storing unit which stores a lower limit of the buffer that is predetermined as being larger than zero; and a first discarding unit which discards, when the number of retained packets in the buffer is less than the stored lower limit as a result of the outputting of one of the read packets and a use count of the corresponding one of the read packets is equal to or larger than a predetermined use count upper limit, the corresponding packet in the retained packets of the buffer.

In the packet fluctuation absorbing method and apparatus of the present invention, the lower limit of the buffer that is predetermined as being larger than zero is stored. When the number of retained packets in the buffer is less than the stored lower limit as a result of the outputting of one of the read packets and a use count of the corresponding one of the read packets is equal to or larger than a predetermined use count upper limit, the corresponding packet in the retained packets of the buffer is discarded. When the amount of the retained packets in the buffer is approaching the under flowing condition, the corresponding packet is output from the buffer 32 repeatedly up to the use count upper limit, and the time needed to make the buffer vacant by the outputting of the packets from the buffer is suitably delayed. It is possible to avoid large fluctuations of data at the time of the reproduction at the receiver. The packet fluctuation absorbing method and apparatus of the present invention are effective in absorbing fluctuations of packets at the time of the reproduction and providing good quality of the reproduced data at the receiver.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

Figure 2:
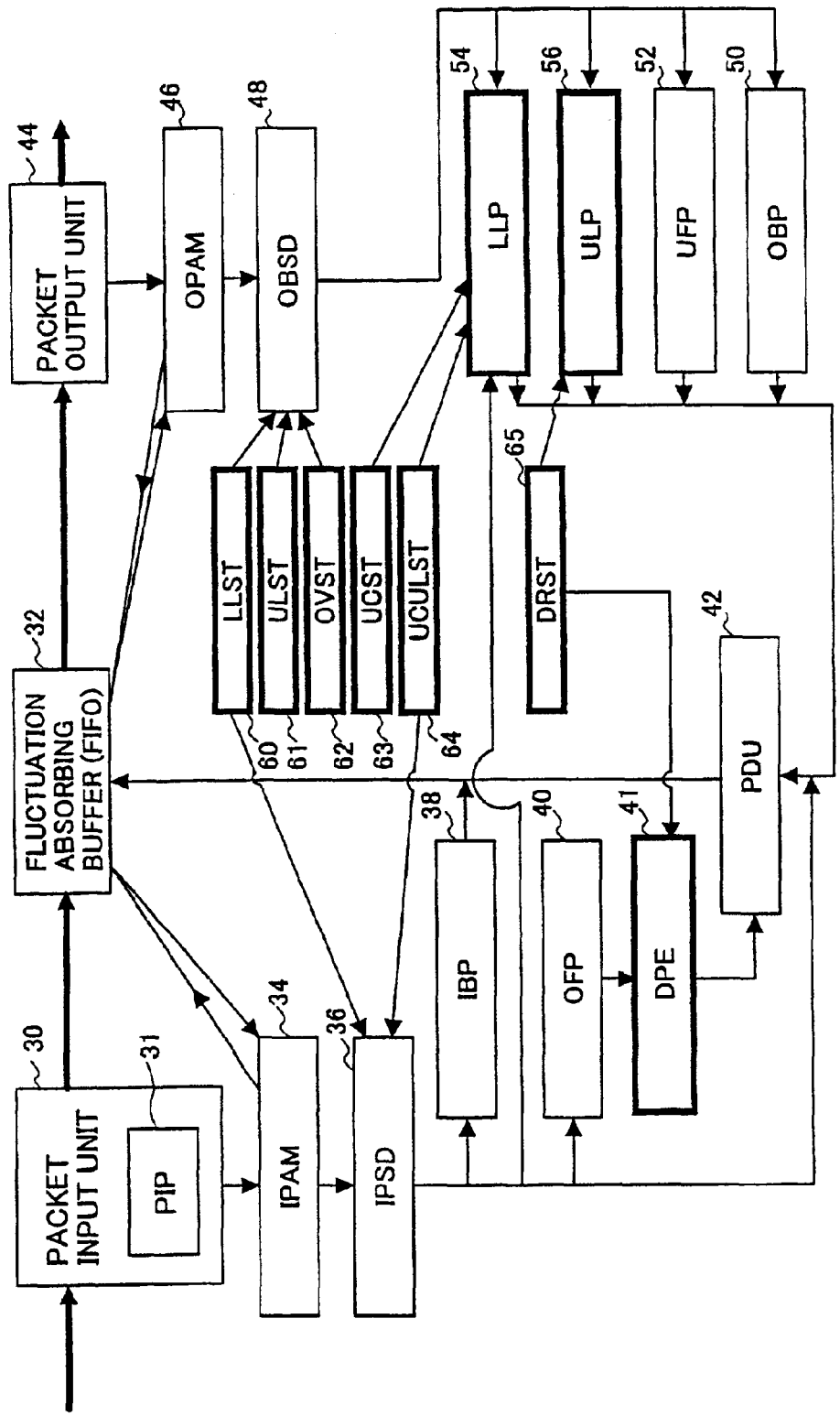
FIG. 2 is a block diagram of one preferred embodiment of the packet fluctuation absorbing apparatus of the present invention.

FIG. 2 shows a configuration of one preferred embodiment of the packet fluctuation absorbing apparatus of the present invention.

For transmission of data beyond a local area, communication is typically achieved by transmitting data from source to destination through a network of intermediate switching nodes. Consider one of the nodes in the network for the installation of the packet fluctuation absorbing apparatus of the present invention. In the following description, suppose a case of the transmission of voice data across the network.

Figure 1:
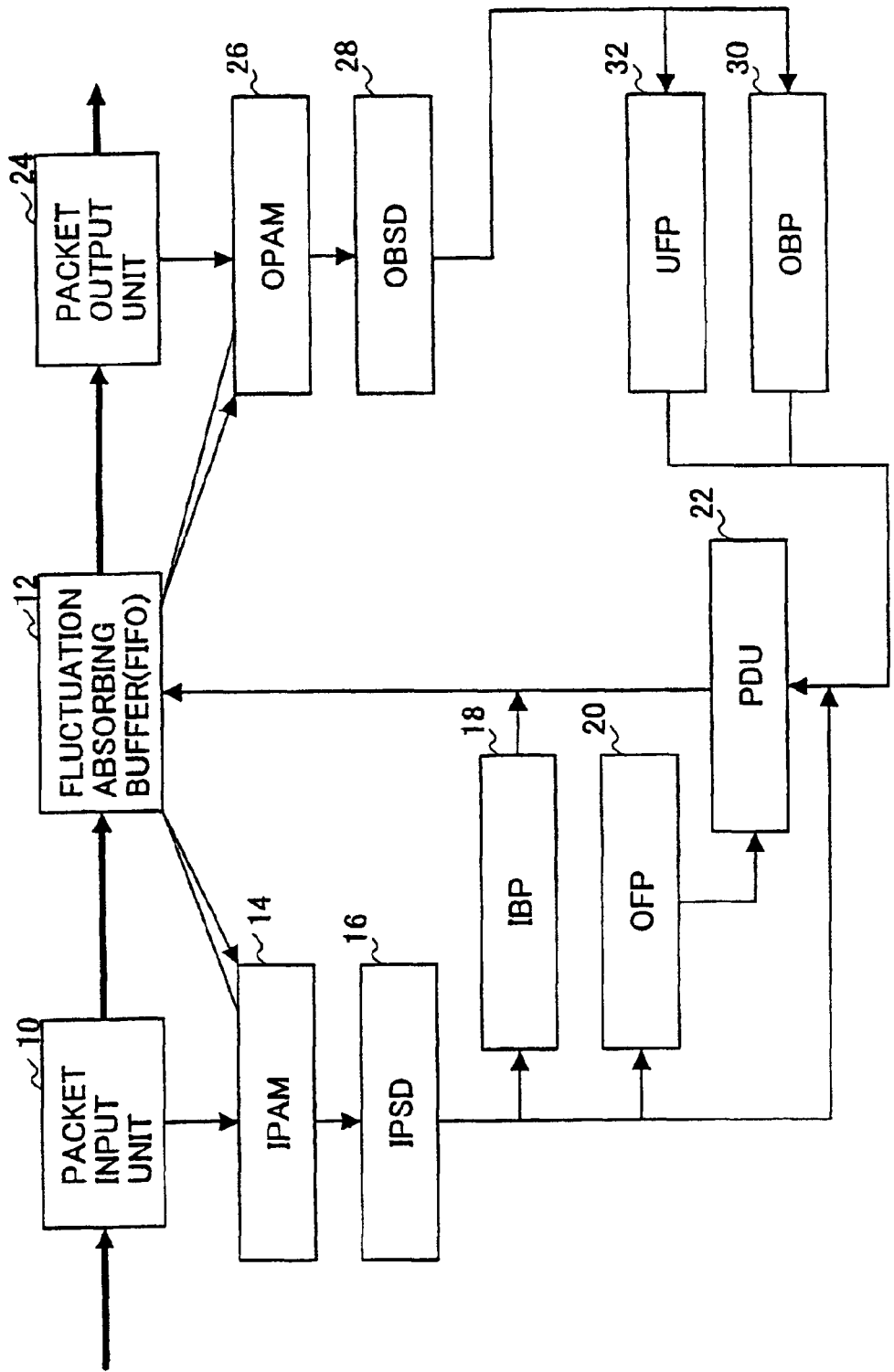
FIG. 1 is a block diagram of a conventional packet fluctuation absorbing apparatus.

As shown in FIG. 2, the packet fluctuation absorbing apparatus of the present embodiment is configured to include a discard packet extracting unit (DPE) 41, a lower limit processing unit (LLP) 54, an upper limit processing unit (ULP) 56, a lower limit storing unit (LLST) 60, an upper limit storing unit (ULST) 61, an optimum value storing unit (OVST) 62, a use count storing unit (UCST) 63, a use count upper limit storing unit (UCULST) 64 and a discard ratio storing unit (DRST) 65, in addition to the elements that are essentially the same as corresponding elements of the conventional apparatus shown in FIG. 1.

In the packet fluctuation absorbing apparatus of FIG. 2, a packet input unit 30 receives packets from a preceding node of the network or the source (not shown), and sends the received packets to a fluctuation absorbing buffer (FIFO) 32. The packet input unit 30 informs an input packet amount monitoring unit (IPAM) 34 of the number of the incoming packets to the buffer 32 every time one of the incoming packets is input to the buffer 32. The number of the incoming packets will be called the IP number.

The packet input unit 30 includes a packet identifying part (PIP) 31. The PIP 31 determines whether each of the incoming packets received at the packet input unit 30 is valid (namely, the packet contains voice data) or invalid (namely, the packet contains no voice data), and, as a result of the determination, the PIP 31 adds a valid/invalid indication to a header portion of each of the incoming packets.

When the information from the packet input unit 30 is received, the IPAM 34 retrieves the number of packets retained in the buffer 32 (which will be called the RP number) from the buffer 32. The IPAM 34 informs an input packet state determining unit (IPSD) 36 of both the IP number and the RP number.

Figure 3:
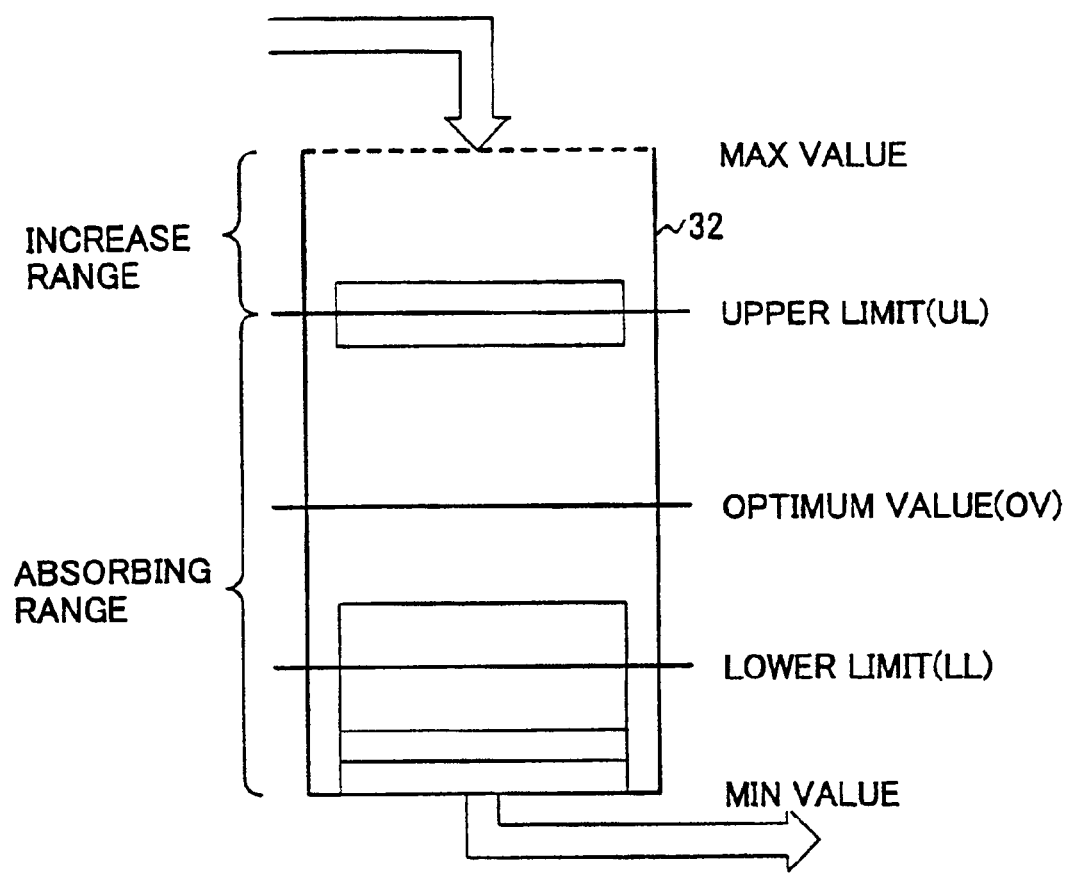
FIG. 3 is a diagram for explaining a fluctuation absorbing buffer in the packet fluctuation absorbing apparatus of FIG. 2.

FIG. 3 shows a structure of the fluctuation absorbing buffer 32 in the packet fluctuation absorbing apparatus of FIG. 2.

As shown in FIG. 3, a maximum value of the retained packets is predetermined for the buffer 32. For example, in the present embodiment, the maximum value is set to 25, and the buffer 32 is capable of 25 packets at the maximum. An upper limit (UL) of the retained packets is predetermined for the buffer 32. For example, in the present embodiment, the upper limit (UL) is set to 20. An optimum value (OV) of the retained packets is predetermined for the buffer 32. For example, in the present embodiment, the optimum value (OV) is set to 15. A lower limit (LL) of the retained packets is predetermined for the buffer 32. For example, the lower limit (LL) is set to 5. A minimum value of the retained packets for the buffer 32 in the present embodiment is set to 0.

In the packet fluctuation absorbing apparatus of FIG. 2, when the information from the IPAM 34 is received, the IPSD 36 receives the lower limit (LL) of the buffer 32 from the LLST 60, and determines whether the RP number is above the lower limit (LL) of the buffer 32. When the RP number is above the lower limit (LL), the IPSD 36 initiates the LLP 54. The LLP 54 receives the use count (UC) of one of the retained packets from the UCST 63, and determines whether the use count (UC) of the relevant packet is larger than 0. When the use count (UC) is larger than 0, the IPSD 36 initiates the LLP 54 in a similar manner. The LLP 54 sends a discard request to a packet discarding unit (PDU) 42, so that the PDU 42 discards the excessive packet among the retained packets in the buffer 32 in accordance with the content of the discard request.

In the present embodiment, the use count (UC) of one of the retained packets is provided to indicate the number of outputting actions performed to output the relevant packet from the buffer 32.

Further, when the information from the IPAM 34 is received, the IPSD 36 receives the upper limit (UL) of the buffer 32 from the ULST 61, and determines whether the overflow of the buffer 32 takes place as a result of the inputting of the incoming packets to the buffer 32, based on the IP number and the RP number. Namely, it is determined whether a sum of the retained packets (the RP number) and the incoming packets (the IP number) is above the upper limit (UL) of the buffer 32. When the overflow does not take place, the IPSD 36 initiates an input buffer processing unit (IBP) 38. When the overflow takes place, the IPSD 36 initiates an overflow processing unit (OFP) 40.

When the overflow of the buffer 32 does not take place, the IBP 38 writes the incoming packets to the buffer 32 so that the buffer 32 stores the incoming packets in addition to the previously retained packets.

When the OFP 40 is initiated by the determination that the overflow of the buffer 32 takes place, the OFP 40 sends a discard request to the PDU 42, so that the PDU 42 discards the excessive packets among the previously retained packets in the buffer 32 in accordance with the content of the discard request received from the OFP 40. In a certain case, the PDU 42 discards the invalid packets among the retained packets in the buffer 32. Thus, the number of the valid packets retained in the buffer 32 that are discarded at this time is made as small as possible.

Further, when the OFP 40 is initiated by the IPSD 36, the OFP 40 sends a special discard request to the DPE 41. The DPE 41 receives, in response to the special discard request, a discard packet (DP) ratio from the DRST 65, and extracts some of the retained packets in the buffer 32 in accordance with the DP ratio received from the DRST 65. The ratio of the extracted packets to the retained packets in the buffer 32 is made to conform to the DP ratio received from the DRST 65. The DPE 41 informs the PDU 42 of the extracted packets. The PDU 42 discards the extracted packets among the retained packets of the buffer 32. Accordingly, it is possible for the present embodiment to prevent the successive packets among the retained packets in the buffer 32 from being completely discarded when avoiding the overflow of the buffer 32.

In the packet fluctuation absorbing apparatus of FIG. 2, a packet output unit 44 reads the outgoing packets from the buffer 32 at given time instants, and sends the outgoing packets to a following node (not shown) of the network. The packet output unit 44 informs an output packet amount monitoring unit (OPAM) 46 of the packet outputting every time one of the outgoing packets (which will be called the OP number) is output from the buffer 32.

When the information from the packet output unit 44 is received, the OPAM 46 retrieves the number of packets retained in the buffer 32 (the RP number) from the buffer 32. The OPAM 46 informs an output buffer state determining unit (OBSD) 48 of the RP number.

When the information from the OPAM 46 is received, the OBSD 48 receives the lower limit (LL) of the buffer 32 from the LLST 60, receives the upper limit (UL) of the buffer 32 from the ULST 61, and receives the optimum value (OV) of the buffer 32 from the OVST 62. The OBSD 48 determines whether the RP number is above the lower level (LL) of the buffer 32. When the RP number is above the LL, the OBSD 48 initiates the lower limit processing unit (LLP) 54. Further, the OBSD 48 determines whether the RP number is above the upper limit (UL) of the buffer 32. When the RP number is above the UL, the OBSD 48 initiates the upper limit processing unit (ULP) 56.

When the LLP 54 is initiated by the OBSD 48, the LLP 54 receives the use count (UC) of one of the retained packets from the UCST 63, receives the use count upper limit (UCUL) from the UCULST 64, and determines whether the use count (UC) is less than the use count upper limit (UCUL). When UC<UCUL, it is determined that the relevant packet in the buffer 32 should not be discarded. The LLP 54 sends a discard request in which the DP number is set to 0, to the PDU 42. The PDU 42 does not discard the relevant packet in the buffer 32 in accordance with the content of the discard request received from the LLP 54. After this, the use count (UC) is incremented.

In the present embodiment, the use count (UC) of one of the retained packets is provided to indicate the number of outputting actions actually performed to output the relevant packet from the buffer 32. The use count upper level (UCUL) is provided to indicate the upper level of the number of outputting actions allowed to output the relevant packet from the buffer 32.

On the other hand, when US≧UCUL, it is determined that the relevant packet in the buffer 32 should be discarded because the use count is above the use count upper level. The LLP 54 sends a discard request in which the DP number is set to 1, to the PDU 42. The PDU 42 discards the relevant packet in the buffer 32 in accordance with the content of the discard request received from the LLP 54. After this, the use count (UC) is incremented.

Accordingly, in the present embodiment, when the amount of the retained packets in the buffer 32 is approaching the underflowing condition, the corresponding packet is output from the buffer 32 repeatedly up to the use count upper limit, and the time needed to make the buffer vacant by the outputting of the packets from the buffer is suitably delayed. It is possible to avoid large fluctuations of data at the time of the reproduction at the receiver.

When the ULP 56 is initiated by the OBSD 48, the ULP 56 receives the discard packet (DP) ratio from the DRST 65, and sends a discard request, containing the DP ratio, to the PDU 42. The PDU 42 discards the excessive packets of the retained packets in the buffer 32 in accordance with the DP ratio received from the DRST 65. The ratio of the discarded packets to the retained packets in the buffer 32 is made to conform to the DP ratio received from the DRST 65. Accordingly, it is possible for the present embodiment to prevent the successive packets among the retained packets in the buffer 32 from being completely discarded when avoiding the overflow of the buffer 32.

Further, the OBSD 48 initiates an output buffer processing unit (OBP) 50 when the RP number is larger than the lower limit (LL) of the buffer 32 and less than the optimum value (OV) of the buffer 32, and initiates an underflow processing unit (UFP) 52 when the underflow of the buffer 32 takes place as a result of the outputting of the outgoing packets from the buffer 32.

When the OBP 50 is initiated by the OBSD 48, the OBP 50 sends a discard request in which the DP number is set to 1, to the PDU 42. The PDU 42 discards the relevant packet among the retained packets in the buffer 32 in accordance with the content of the discard request from the OBP 50. Accordingly, the amount of the retained packets in the buffer 32 is maintained at the optimum value.

When the UFP 52 is initiated by the OBSD 48, the RP number is less than the lower level (LL) of the buffer 32 as a result of the outputting of the outgoing packets from the buffer 32, which will cause the underflow of the buffer 32. To avoid this, the UFP 52 sends a discard-inhibition request to the PDU 42. In accordance with the discard-inhibition request, the PDU 42 is inhibited from discarding the outgoing packets output from the buffer 32 by the packet output unit 44.

Figure 4:
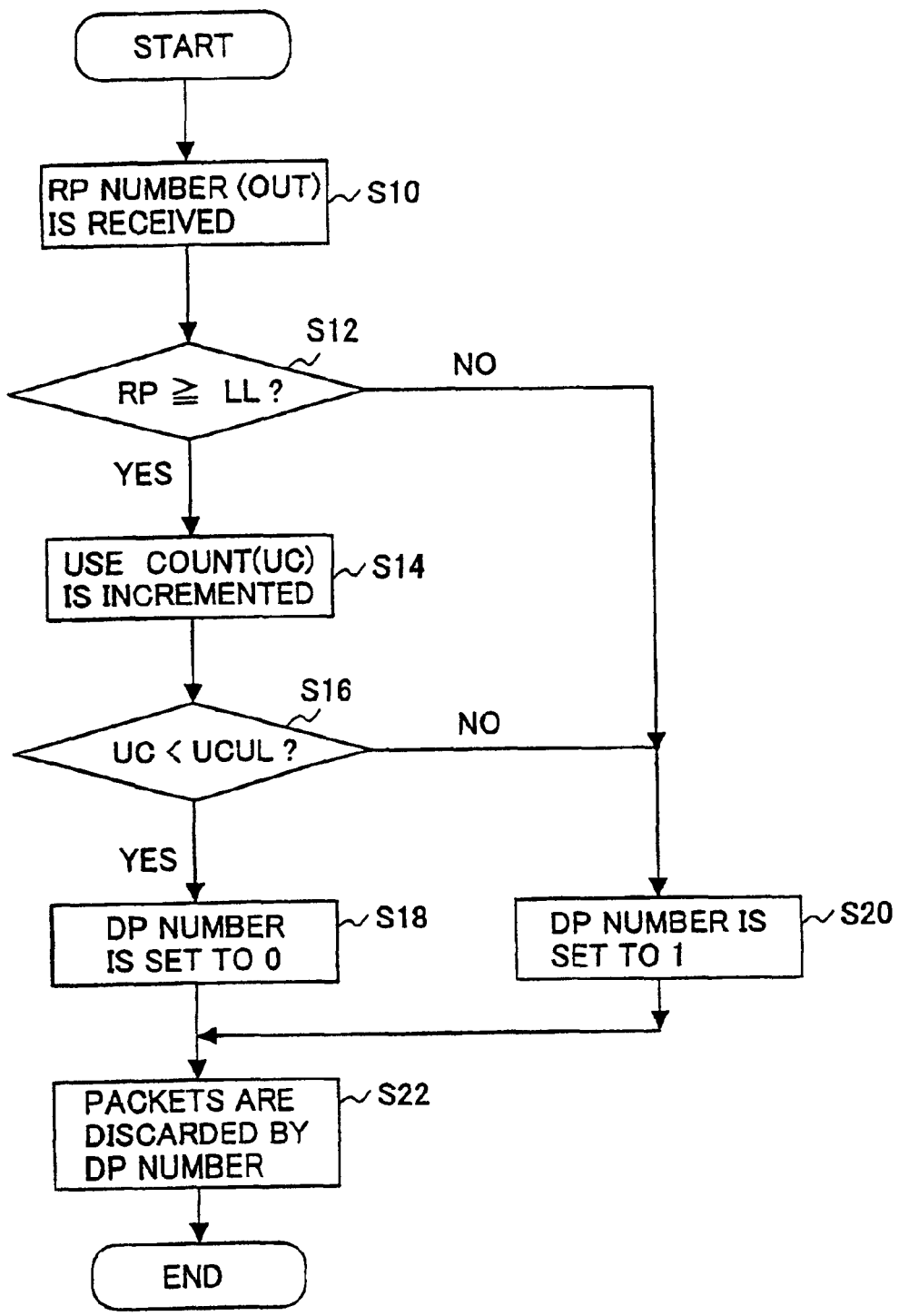
FIG. 4 is a flowchart for explaining a control process executed by the packet fluctuation absorbing apparatus of FIG. 2 when the number of packets retained in the buffer is too small.

FIG. 4 is a flowchart for explaining a control process executed by the packet fluctuation absorbing apparatus of FIG. 2 when the number of packets retained in the buffer is too small.

In the control process shown in FIG. 4, the OPAM 46 receives the RP number (the number of retained packets in the buffer 32) from the buffer 32 (S10).

After step S10 is performed, the OBSD 48 determines whether the RP number is above the lower level (LL) of the buffer 32 as a result of the outputting of one of the read packets (S12). When RP≧LL, the OBSD 48 increments the use count (UC) of the corresponding packet of the read packets (S14). Then, the OBSD 48 initiates the LLP 54. The LLP 54 determines whether the use count UC (read from the UCST 63) is less than the use count upper limit UCUL (read from the UCULST 64) (S16).

When the result at step S12 is negative (RP<LL), the LLP 54 sets the DP number to 1 and sends the discard request, containing the DP number, to the PDU 42 (S20). After the step S20 is performed, the PDU 42 discards none of the read packets of the buffer 32 in accordance with the content of the discard request (S22).

When the result at step S16 is negative (UC≧UCUL), the LLP 54 performs the above step S20. After the step S20 is performed, the PDU 42 performs the above step S22.

When the result at step S16 is affirmative (UC<UCUL), the LLP 54 sets the DP number to 0 and sends the discard request, containing the DP number, to the PDU 42 (S18). After the step S18 is performed, the PDU 42 discards none of the read packets of the buffer 32 in accordance with the content of the discard request (S22). After the step S22 is performed, the control process of FIG. 4 is finished.

According to the packet fluctuation absorbing apparatus and method of the present embodiment, when the amount of the retained packets in the buffer is approaching the underflowing condition, the corresponding packet is output from the buffer 32 repeatedly up to the use count upper limit, and the time needed to make the buffer vacant by the outputting of the packets from the buffer is suitably delayed. It is possible to avoid large fluctuations of data at the time of the reproduction at the receiver. The packet fluctuation absorbing method and apparatus of the present embodiment are effective in absorbing fluctuations of packets at the time of the reproduction and providing good quality of the reproduced data at the receiver.

Figure 5:
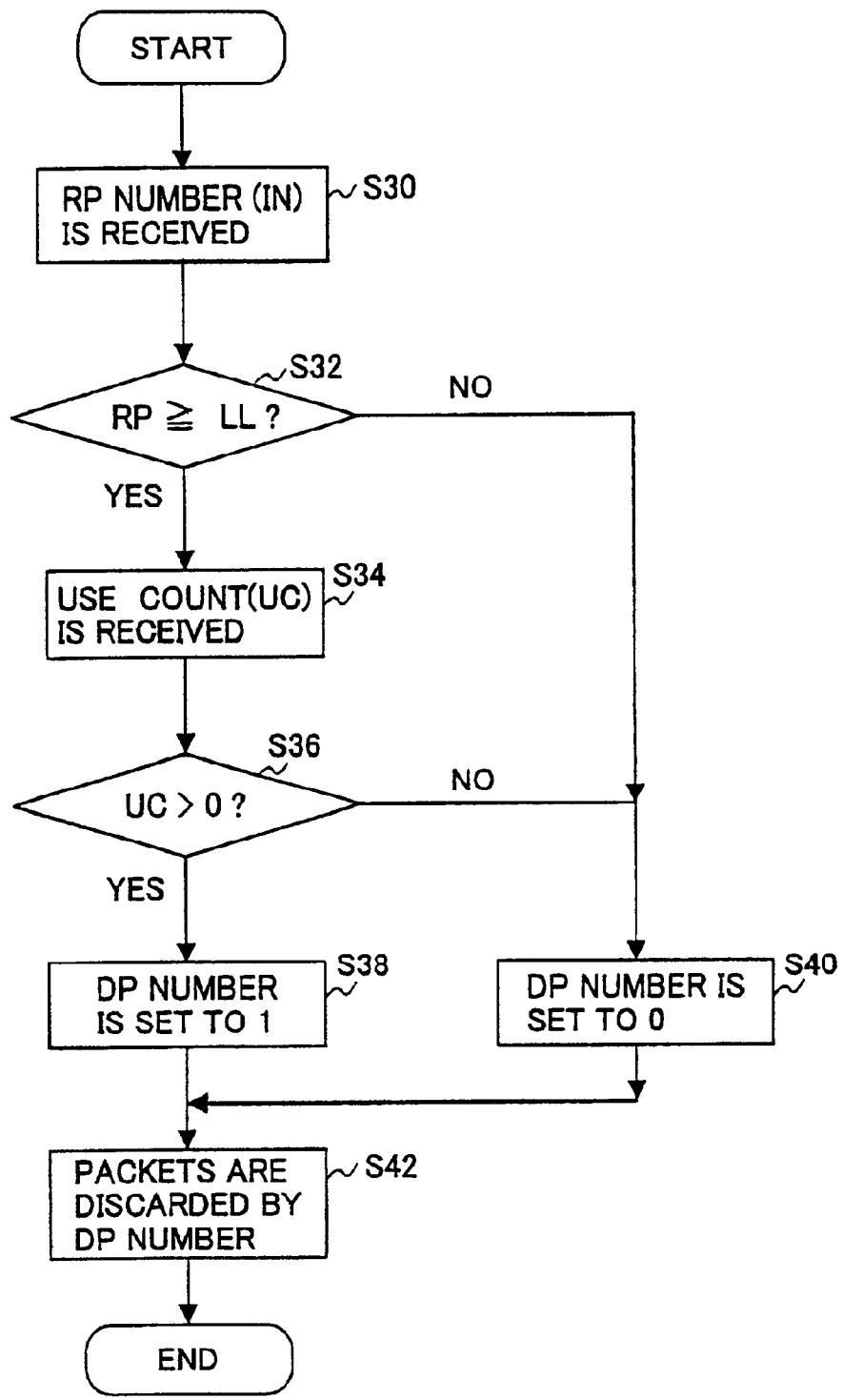
FIG. 5 is a flowchart for explaining a control process executed by the packet fluctuation absorbing apparatus of FIG. 2 when the number of packets retained in the buffer is increasing from the lower limit.

FIG. 5 is a flowchart for explaining a control process executed by the packet fluctuation absorbing apparatus of FIG. 2 when the number of packets retained in the buffer is increasing from the lower limit.

In the control process shown in FIG. 5, the IPAM 34 receives the RP number (the number of retained packets in the buffer 32) from the buffer 32 (S30).

After step S30 is performed, the IPSD 36 determines whether the RP number is above the lower level (LL) of the buffer 32 as a result of the inputting of one of the received packets (S32). When RP≧LL, the IPSD 36 receives the use count (UC) of the corresponding one of the received packets from the UCST 62 (S34). Then, the IPSD 36 determines whether the use count (UC) of the corresponding packet is larger than zero (S36).

When the result at step S36 is affirmative (UC>0), the IPSD 36 initiates the LLP 54. The LLP 54 sets the DP number to 1 and sends the discard request, containing the DP number, to the PDU 42 (S38). After the step S38 is performed, the PDU 42 discards the excessive packet in the retained packets of the buffer 32 in accordance with the content of the discard request (S42). After the corresponding packet is discarded, the use count (UC) is reset to zero.

When the result at step S32 is negative (RP<LL), the LLP 54 sets the DP number to 0 and sends the discard request, containing the DP number, to the PDU 42 (S40). After the step S40 is performed, the PDU 42 performs the step S22. In this case, the PDU 42 discards none of the read packets of the buffer 32 in accordance with the content of the discard request.

When the result at step S36 is negative (UC=0), the LLP 54 performs the above step S40. After the step S40 is performed, the PDU 42 performs the above step S42. After the step S42 is performed, the control process of FIG. 5 is finished.

According to the packet fluctuation absorbing apparatus and method of the present embodiment, when the amount of the retained packets in the buffer is increasing, the corresponding packet is output from the buffer 32 repeatedly up to the use count upper limit, and the time needed to make the buffer vacant by the outputting of the packets from the buffer is suitably delayed. It is possible to avoid large fluctuations of data at the time of the reproduction at the receiver. The packet fluctuation absorbing method and apparatus of the present embodiment are effective in absorbing fluctuations of packets at the time of the reproduction and providing good quality of the reproduced data at the receiver.

Figure 6:
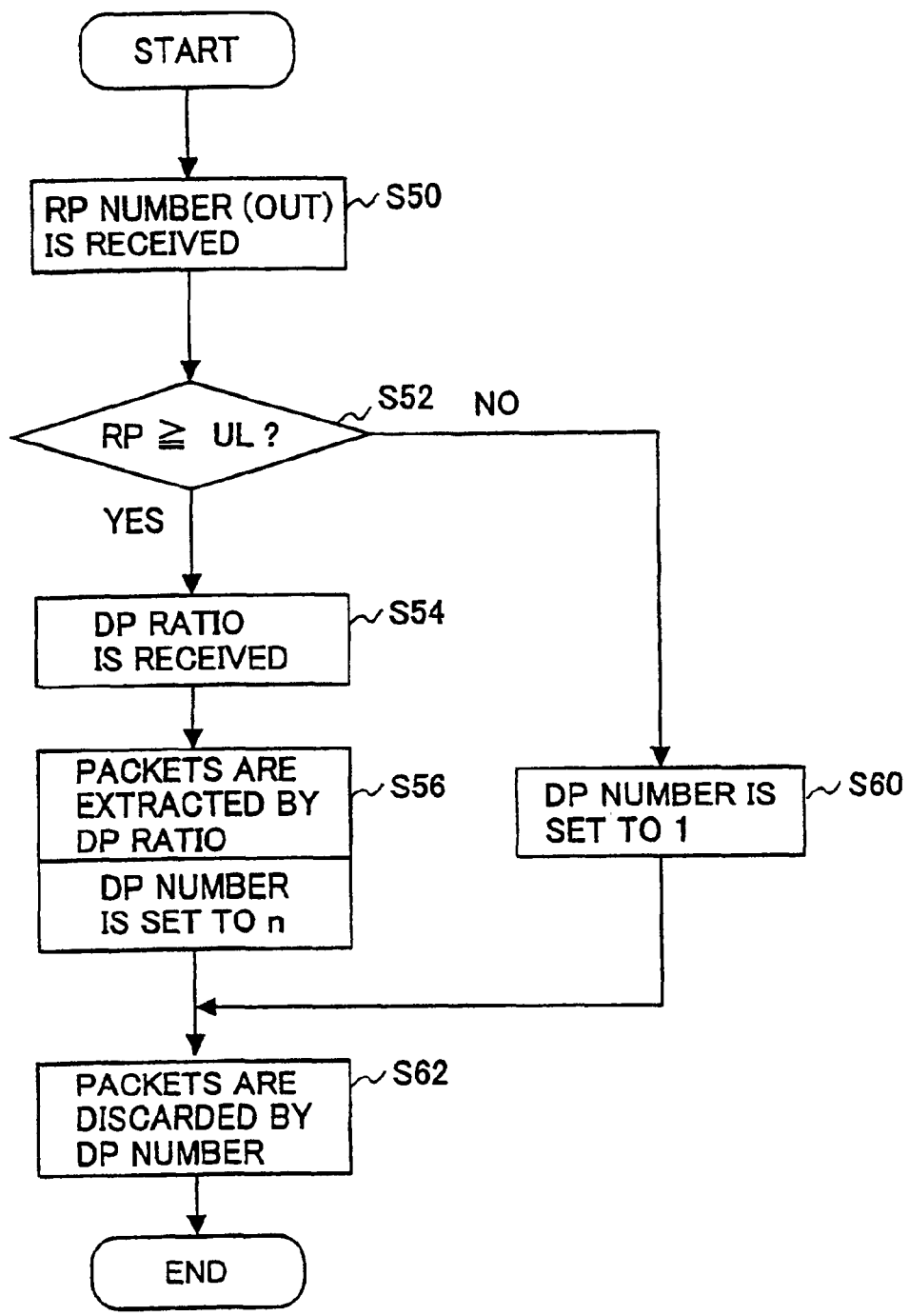
FIG. 6 is a flowchart for explaining a control process executed by the packet fluctuation absorbing apparatus of FIG. 2 when the number of packets retained in the buffer is too large.

FIG. 6 is a flowchart for explaining a control process executed by the packet fluctuation absorbing apparatus of FIG. 2 when the number of packets retained in the buffer is too large.

In the control process shown in FIG. 6, the OPAM 46 receives the RP number from the buffer 32 (S50).

After step S50 is performed, the OBSD 48 determines whether the RP number is above the upper level (UL) of the buffer 32 (read from the ULST 61) as a result of the outputting of one of the read packets (S52). When RP≧UL, the OBSD 48 initiates the ULP 56. The ULP 56 receives the DP ratio from the DRST 65 (S54). The ULP 56 extracts the packets from the retained packets of the buffer 32 in accordance with on the DP ratio received from the DRST 65, sets the DP number to "n" (where n is an arbitrary integer), and sends the discard request, containing the DP number, to the PDU 42 (S56). After the step S56 is performed, the PDU 42 discards the excessive packets of the read packets of the buffer 32 in accordance with the content of the discard request (S62).

When the result at step S52 is negative (RP<UL), the ULP 56 sets the DP number to 1 and sends the discard request, containing the DP number, to the PDU 42 (S60). After the step S60 is performed, the PDU 42 discards the excessive packet of the read packets of the buffer 32 in accordance with the content of the discard request (S62). After the step S62 is performed, the control process of FIG. 6 is finished.

According to the packet fluctuation absorbing apparatus and method of the present embodiment, when the amount of the retained packets in the buffer is approaching the overflowing condition, the number of the discarded packets can be made as small as possible. It is possible to avoid large fluctuations of data at the time of the reproduction at the receiver. The packet fluctuation absorbing method and apparatus of the present embodiment are effective in absorbing fluctuations of packets at the time of the reproduction and providing good quality of the reproduced data at the receiver.

Figure 7:
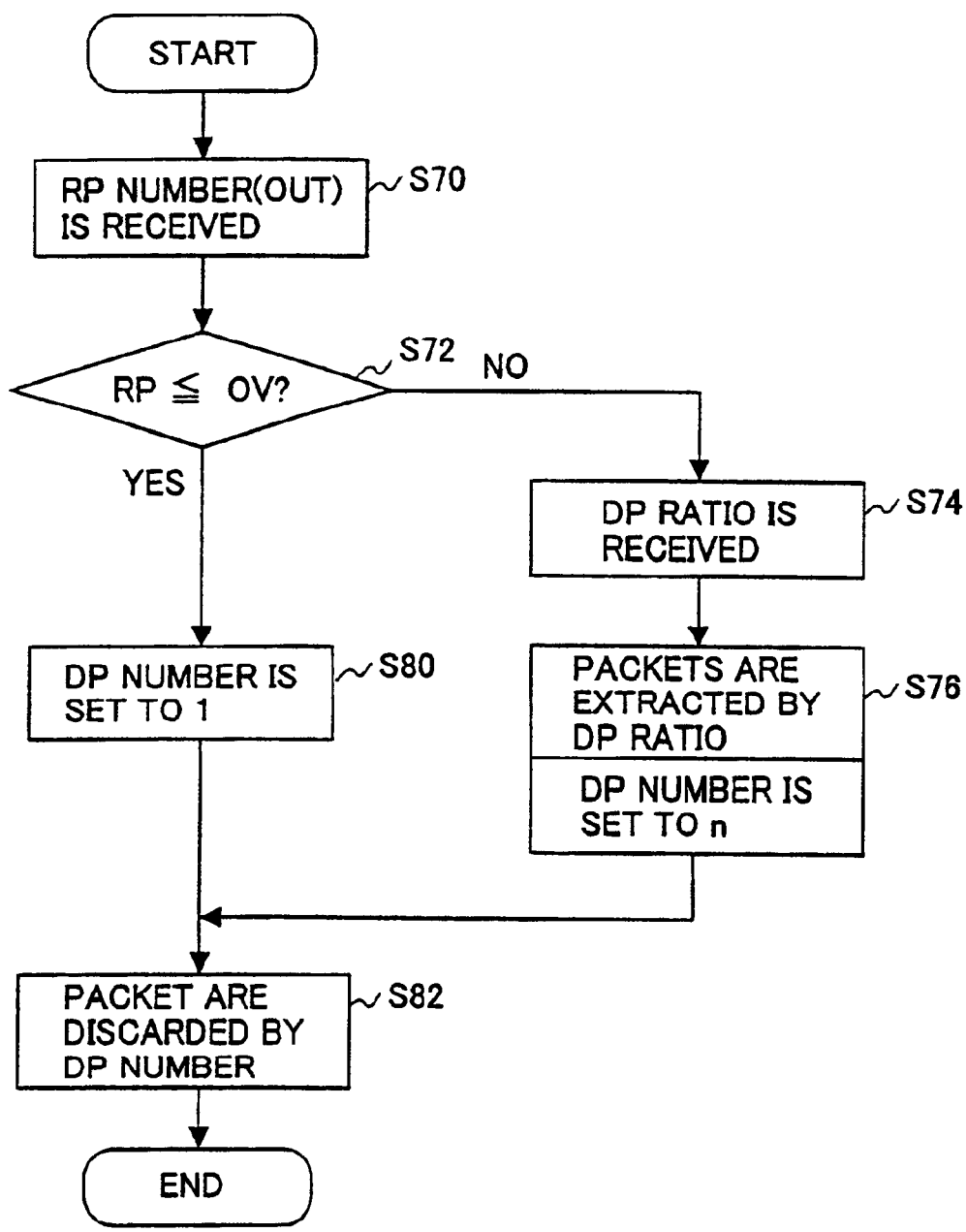
FIG. 7 is a flowchart for explaining a control process executed by the packet fluctuation absorbing apparatus of FIG. 2 when the number of packets retained in the buffer is around at the optimum level.

FIG. 7 is a flowchart for explaining a control process executed by the packet fluctuation absorbing apparatus of FIG. 2 when the number of packets retained in the buffer is around at the optimum level.

In the control process shown in FIG. 7, the OPAM 46 receives the RP number from the buffer 32 (S70). After step S70 is performed, the OBSD 48 determines whether the RP number is below the optimum value (OV) of the buffer 32 (read from the OVST 62) as a result of the outputting of one of the read packets (S72).

When the result at the step S72 is negative (RP>OV), the OBSD 48 initiates the ULP 56. The ULP 56 receives the DP ratio from the DRST 65 (S74). The ULP 56 extracts the packets from the retained packets of the buffer 32 in accordance with on the DP ratio received from the DRST 65, sets the DP number to "n" (where n is an arbitrary integer), and sends the discard request, containing the DP number, to the PDU 42 (S76). After the step S76 is performed, the PDU 42 discards the excessive packets of the read packets of the buffer 32 in accordance with the content of the discard request (S82).

When the result at step S72 is affirmative (RP≦OV), the ULP 56 sets the DP number to 1, and sends the discard request, containing the DP number, to the PDU 42 (S80). After the step S80 is performed, the PDU 42 discards the excessive packet of the read packets of the buffer 32 in accordance with the content of the discard request (S82). After the step S82 is performed, the control process of FIG. 7 is finished.

According to the packet fluctuation absorbing apparatus and method of the present embodiment, when the amount of the retained packets in the buffer is around the optimum value, it is possible to avoid large fluctuations of data at the time of the reproduction at the receiver. The packet fluctuation absorbing method and apparatus of the present embodiment are effective in absorbing fluctuations of packets at the time of the reproduction and providing good quality of the reproduced data at the receiver.

Figure 8:
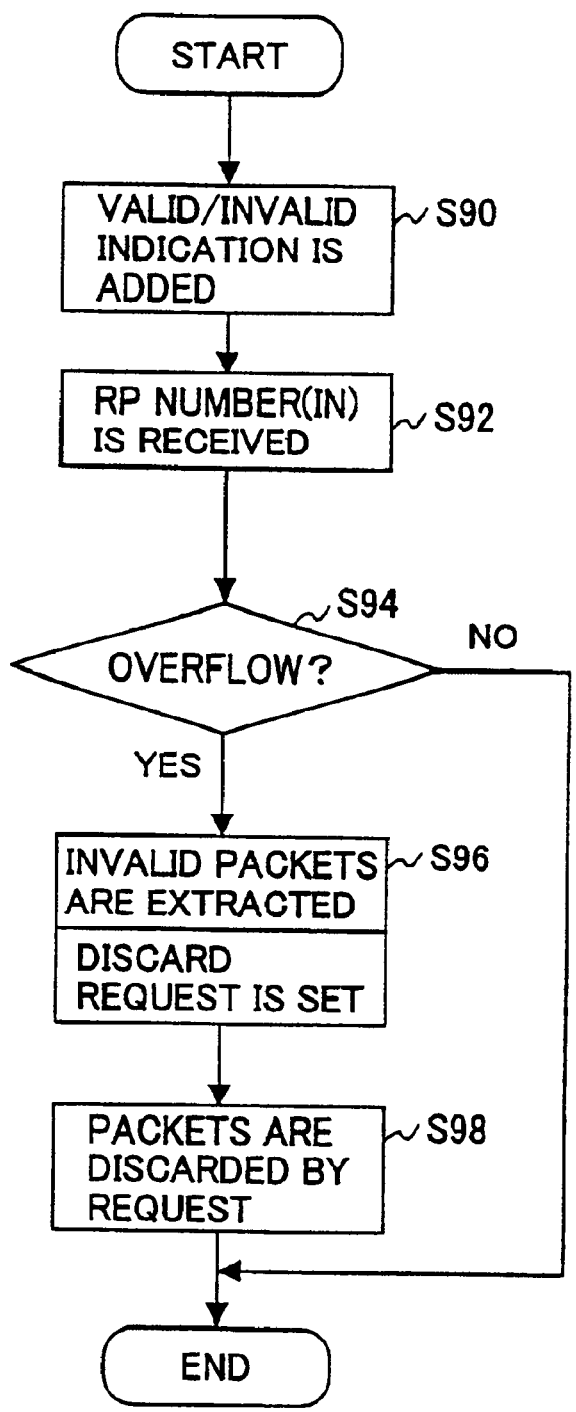
FIG. 8 is a flowchart for explaining a control process executed by the packet fluctuation absorbing apparatus of FIG. 2 when the overflow of the buffer takes place.

FIG. 8 is a flowchart for explaining a control process executed by the packet fluctuation absorbing apparatus of FIG. 2 when the overflow of the buffer 32 takes place.

In the control process shown in FIG. 8, the packet identifying part (PIP) 31 determines whether each of the incoming packets, received at the packet input unit 30, is valid (namely, the packet contains voice data) or invalid (namely, the packet contains no voice data), and adds a valid/invalid indication to a header portion of each of the incoming packets (S90).

After the step S90 is performed, the IPAM 34 receives the RP number from the buffer 32 (S92).

After step S92 is performed, the IPSD 36 determines whether the RP number is above the upper level (UL) of the buffer 32 as a result of the inputting of one of the received packets (S94).

When the result at step S94 is affirmative (RP≧UL), it is determined that the overflow of the buffer 32 takes place as a result of the inputting of the received packets to the buffer 32. The IPSD 36 initiates the OFP 40, and the OFP 40 requests the DPE 41 to extract the invalid packets from among the received packets in the packet input unit 30. The DPE 41 extracts the invalid packets from among the received packets in response to the request, and sends the discard request to the PDU 42, the discard request indicating the extracted invalid packets to be discarded (S96).

After the step S96 is performed, the PDU 42 discards the excessive packets in the incoming packets of the buffer 32 in accordance with the content of the discard request (S98).

When the result at step S94 is negative (RP<UL), the control process of FIG. 8 is finished without performing the steps S94–S98.

According to the packet fluctuation absorbing apparatus and method of the present embodiment, when the amount of the received packets in the buffer 32 is above the upper limit, only the invalid packets are discarded by the PDU 42 and the number of the valid packets being discarded is minimized. It is possible to avoid large fluctuations of data at the time of the reproduction at the receiver. The packet fluctuation absorbing method and apparatus of the present embodiment are effective in absorbing fluctuations of packets at the time of the reproduction and providing good quality of the reproduced data at the receiver.

Figure 9:
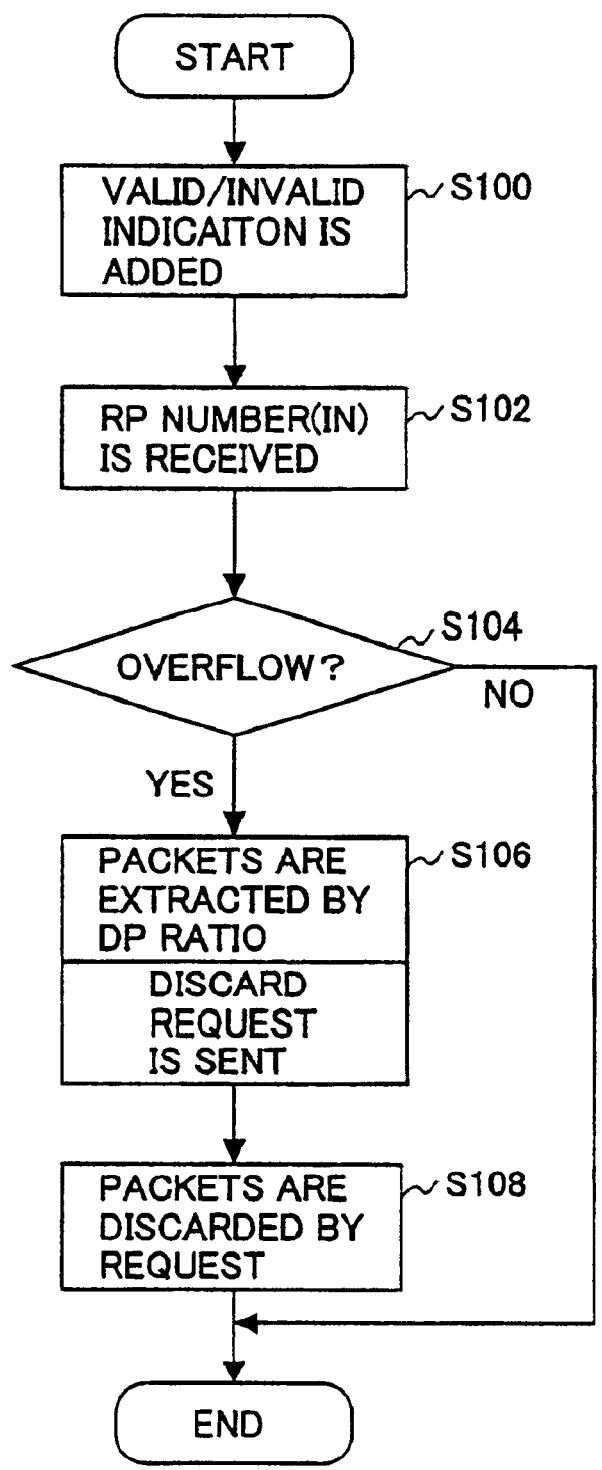
FIG. 9 is a flowchart for explaining another control process executed by the packet fluctuation absorbing apparatus of FIG. 2 when the overflow of the buffer takes place.

FIG. 9 is a flowchart for explaining another control process executed by the packet fluctuation absorbing apparatus of FIG. 2 when the overflow of the buffer 32 takes place.

In the control process shown in FIG. 9, the PIP 31 determines whether each of the incoming packets, received at the packet input unit 30, is valid or invalid, and adds a valid/invalid indication to a header portion of each of the incoming packets (S100).

After the step S100 is performed, the IPAM 34 receives the RP number from the buffer 32 (S102).

After step S102 is performed, the IPSD 36 determines whether the RP number is above the upper level (UL) of the buffer 32 as a result of the inputting of one of the received packets (S104).

When the result at step S104 is affirmative (RP≧UL), it is determined that the overflow of the buffer 32 takes place as a result of the inputting of the received packets to the buffer 32. The IPSD 36 initiates the OFP 40, and the OFP 40 requests the DPE 41 to receive the DP ratio from the DRST 65. Further, the OFP 40 requests the DPE 41 to extract the excessive packets from among the received packets in the packet input unit 30 in accordance with the DP ratio. The DPE 41 extracts the excessive packets from among the received packets in accordance with the DP ratio of the request, and sends the discard request to the PDU 42, the discard request indicating the extracted packets to be discarded (S106).

After the step S106 is performed, the PDU 42 discards the excessive packets in the incoming packets of the buffer 32 in accordance with the content of the discard request (S108).

When the result at step S104 is negative (RP<UL), the control process of FIG. 9 is finished without performing the steps S104–S108.

According to the packet fluctuation absorbing apparatus and method of the present embodiment, when the amount of the received packets in the buffer 32 is above the upper limit, only the invalid packets are discarded by the PDU 42 and the number of the valid packets being discarded is minimized. It is possible to avoid large fluctuations of data at the time of the reproduction at the receiver. The packet fluctuation absorbing method and apparatus of the present embodiment are effective in absorbing fluctuations of packets at the time of the reproduction and providing good quality of the reproduced data at the receiver.

Next, a description will be given of operations of the packet fluctuation absorbing apparatus and method of the present embodiment with reference to FIG. 10 through FIG. 13.

In the following description, suppose a case of transmission of voice data across a network of intermediate switching nodes, and the fluctuation absorbing apparatus of FIG. 2 is installed at each of the nodes in the network. In the present embodiment, the duration between the time instants at which respective packets of voice data (which will be called the voice packets) are transmitted across the network is 20 ms.

For the sake of convenience of description, it is assumed that the maximum value of the buffer 32 is set to 25 packets (equivalent to 500 ms), the upper limit (UL) of the buffer 32 is set to 20 packets (equivalent to 400 ms), the optimum value (OV) of the buffer 32 is set to 15 packets (equivalent to 300 ms), the lower limit (LL) of the buffer 32 is set to 5 packets (equivalent to 100 ms), and the use count upper limit (UCUL) is set to 2 (equivalent to 40 ms). In the packet fluctuation absorbing apparatus of FIG. 2, the values of the LL, the UL, the OV and the UCUL are stored in the LLST 60, the ULST 61, the OVST 62 and the UCULST 64, respectively. The UCST 63 is initially set to 0.

Figure 10:
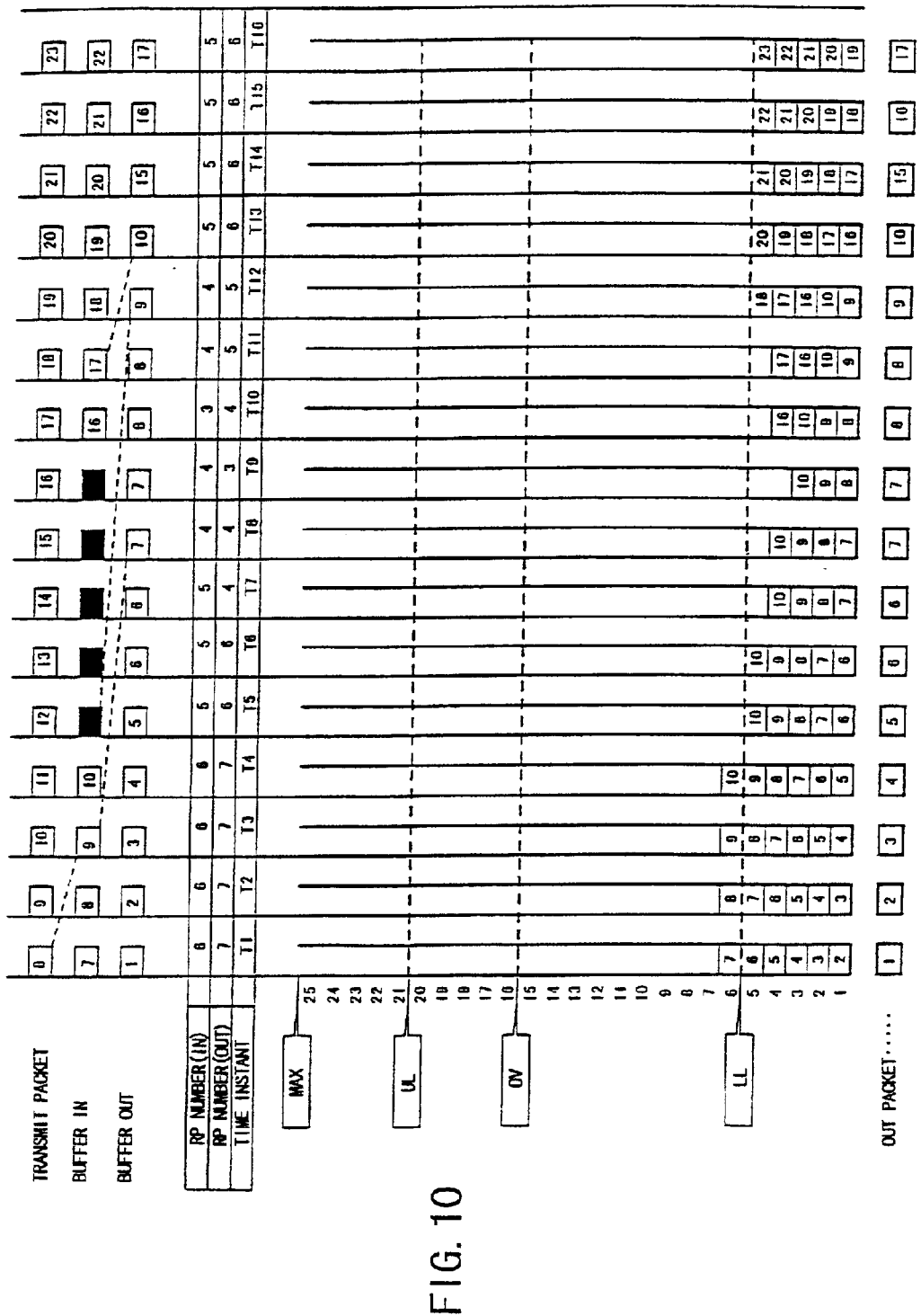
FIG. 10 is a diagram for explaining an operation of the packet fluctuation absorbing method and apparatus of the present embodiment when the control process of FIG. 4 or the control process of FIG. 5 is performed.

FIG. 10 shows an operation of the packet fluctuation absorbing method and apparatus of the present embodiment when the control process of FIG. 4 or the control process of FIG. 5 is performed. In FIG. 10, the black rectangles indicate the packets 11 through 15 that have been lost in the network.

As shown in FIG. 10, at the time instant T6, the number of the retained packets (the RP number) at the input of the buffer 32 is 5, which reaches the lower level (LL) of the buffer 32. The OBSD 48 increments the use count (UC) of the corresponding packet of the read packets (UC=UC+1). The OBSD 48 initiates the LLP 54. The LLP 54 determines whether the UC (read from the UCST 63) is less than the UCUL (read from the UCULST 64). In this case, the UC is set to 1. The LLP 54 sets the DP number to 0, and sends the discard request, containing the DP number, to the PDU 42. The PDU 42 discards none of the read packets of the buffer 32.

In the diagram of FIG. 10, at the time instant T7, the number of the retained packets (the RP number) at the input of the buffer 32 is 5, which reaches the lower level (LL) of the buffer 32. The OPAM 46 receives the RP number from the buffer 32 when receiving the information from the packet output unit 44. The OBSD 48 increments the use count (UC) of the corresponding packet of the read packets (UC=UC+1). The OBSD 48 initiates the LLP 54. The LLP 54 determines whether the UC (read from the UCST 63) is less than the UCUL (read from the UCULST 64). In this case, the UC is set to 2. The LLP 54 sets the DP number to 1, and sends the discard request, containing the DP number, to the PDU 42. The PDU 42 discards the excessive packet of the read packets of the buffer 32. After this, the use count (UC) is reset to 0.

Further, at the time instant T12, the number of the retained packets (the RP number) at the output of the buffer 32 is 5, which reaches the lower level (LL) of the buffer 32. The OPAM 46 receives the RP number from the buffer 32 when receiving the information from the packet output unit 44. The OBSD 48 increments the use count (UC) of the corresponding packet of the read packets (UC=UC+1). The OBSD 48 initiates the LLP 54. The LLP 54 determines whether the UC (read from the UCST 63) is less than the UCUL (read from the UCULST 64). In this case, the UC is set to 1. The LLP 54 sets the DP number to 0, and sends the discard request, containing the DP number, to the PDU 42. The PDU 42 discards none of the read packets of the buffer 32.

Meanwhile, at the time instant T12, the IPAM 34 receives the RP number from the buffer 32 when receiving the information from the packet input unit 30. The IPSD 36 determines whether the RP number is above the lower limit (LL) of the buffer 32 as a result of the inputting of one of the received packets. In this case, RP<LL. The LLP 54 sets the DP number to 0, and sends the discard request, containing the DP number, to the PDU 42. The PDU 42 discards none of the read packets of the buffer 32.

According to the present embodiment, it is possible to prevent the occurrence of the underflow of the buffer 32 and avoid large fluctuations of data at the time of the reproduction at the receiver.

Figure 11:
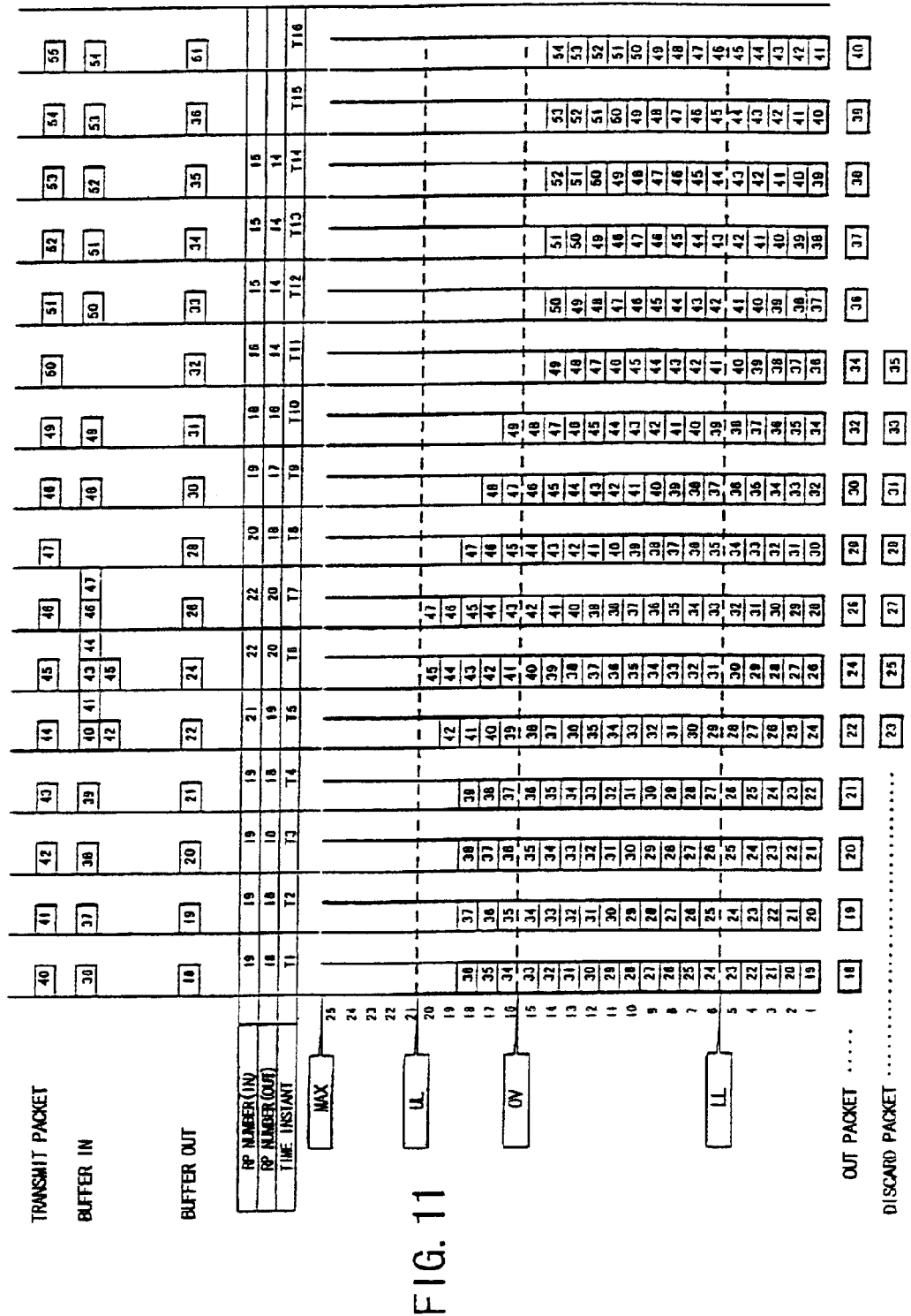
FIG. 11 is a diagram for explaining an operation of the packet fluctuation absorbing method and apparatus of the present embodiment when the control-process of FIG. 6 or the control process of FIG. 7 is performed.

FIG. 11 shows an operation of the packet fluctuation absorbing method and apparatus of the present embodiment when the control process of FIG. 6 or the control process of FIG. 7 is performed.

As shown in FIG. 11, at the time instant T5, it is assumed that two packets are received at the packet input unit 30 at the same time, and the IP number is 2. Suppose that the number of the retained packets (the RP number) at the input of the buffer 32 is 21, which reaches the upper level (UL) of the buffer 32, and the DP ratio is set to 1/2. The OPAM 46 receives the RP number from the buffer 32 when receiving the information from the packet output unit 44. The OBSD 48 determines that the RP number is above the upper limit (UL) of the buffer 32. The OBSD 48 initiates the ULP 56. The ULP 56 receives the DP ratio from the DRST 65. The ULP 56 extracts the packets from the retained packets of the buffer 32 in accordance with the DP ratio, and sends the discard request, containing the DP number, to the PDU 42. The PDU 42 discards the excessive packets of the read packets of the buffer 32 in accordance with the content of the discard request.

In the diagram of FIG. 11, at the time instant T9, the number of the retained packets (the RP number) at the input of the buffer 32 is 19, which is below the upper level (UL) of the buffer 32. The OBSD 48 repeats the initiation of the ULP 56 until the condition RP≦OV is established.

Further, at the time instant T11, the number of the retained packets (the RP number) at the output of the buffer 32 is 14, which is below the optimum value (OV) of the buffer 32. The OBSD 48 initiates the ULP 56. The ULP 56 sets the DP number to 1, and sends the discard request, containing the DP number, to the PDU 42. The PDU 42 discards the excessive packet of the read packets of the buffer 32.

According to the present embodiment, it is possible to prevent the occurrence of the overflow of the buffer 32 and avoid large fluctuations of data at the time of the reproduction at the receiver.

Figure 12:
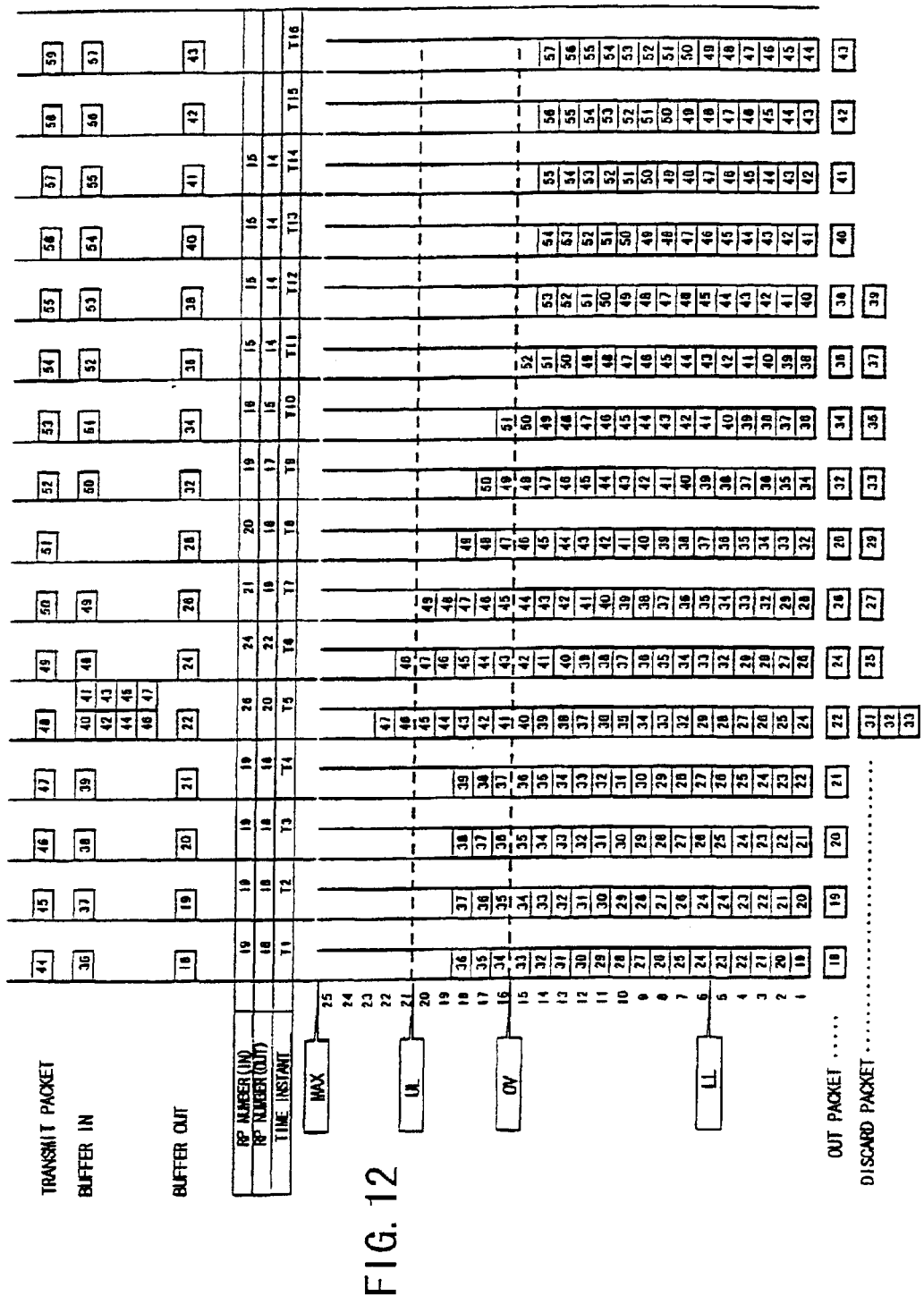
FIG. 12 is a diagram for explaining an operation of the packet fluctuation absorbing method and apparatus of the present embodiment when the control process of FIG. 8 is performed.

FIG. 12 shows an operation of the packet fluctuation absorbing method and apparatus of the present embodiment when the control process of FIG. 8 is performed.

As shown in FIG. 12, at the time instant T5, it is assumed that eight packets are received at the packet input unit 30 at the same time, and the IP number is 8. Suppose that the number of the retained packets (the RP number) at the input of the buffer 32 is 26, which is above the upper level (UL) of the buffer 32, and the DP ratio is set to 1/2. The PIP 31 detects whether each of the received packets is valid or invalid. The IPAM 34 receives the RP number from the buffer 32 when receiving the information from the packet input unit 30. The IPSD 36 determines that the RP number is above the upper limit (UL) of the buffer 32. The IPSD 36 initiates the OFP 40. The OFP 40 requests the DPE 41 to extract the invalid packets from among the received packets in the packet input unit 30. The DPE 41 extracts the invalid packets from among the received packets in response to the request, and sends the discard request to the PDU 42. The PDU 42 discards the excessive packets of the read packets of the buffer 32 in accordance with the content of the discard request.

According to the present embodiment, it is possible to minimize the discarding of the valid packets at the time of the overflow of the buffer 32 and avoid large fluctuations of data at the time of the reproduction at the receiver.

Figure 13:
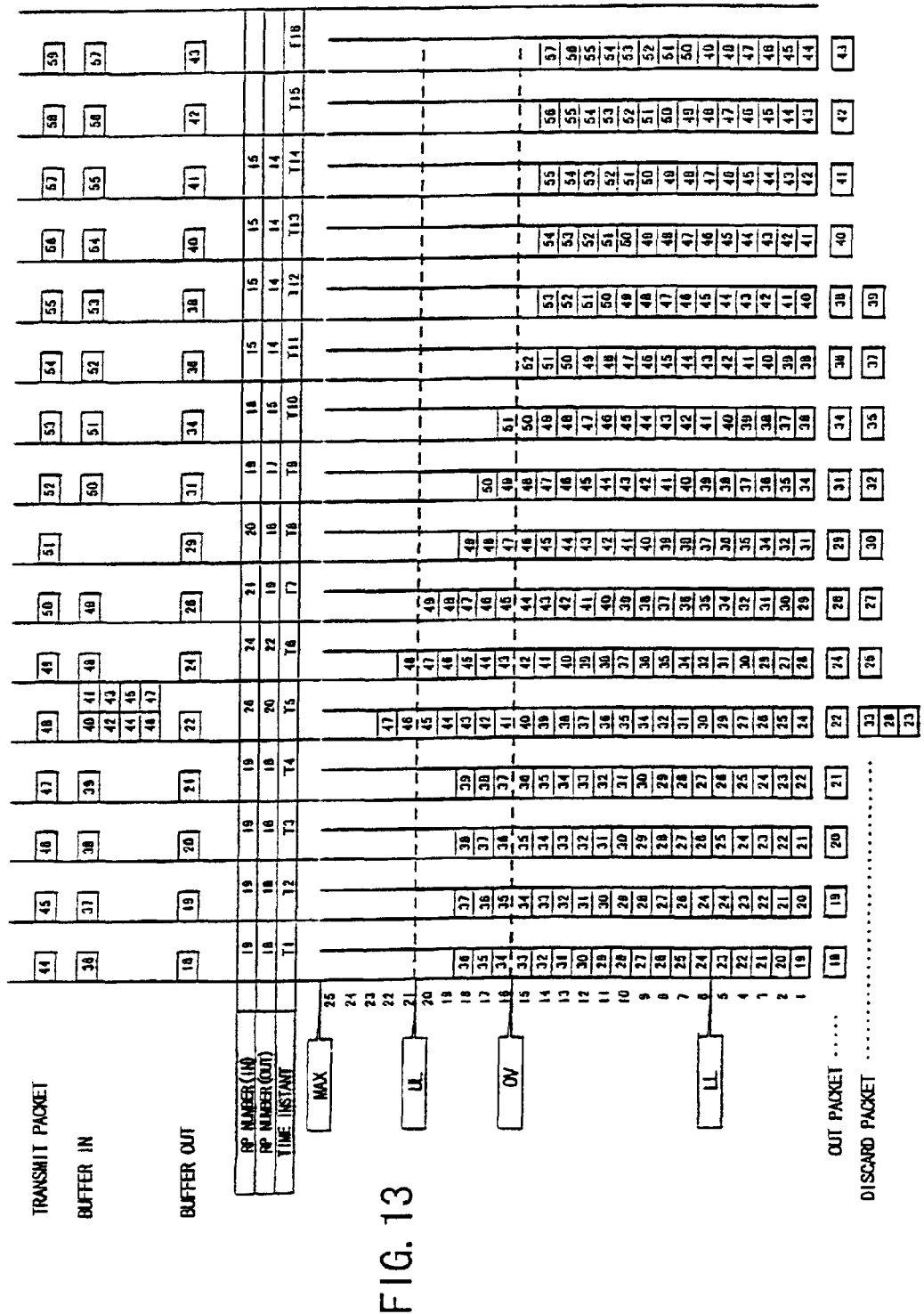
FIG. 13 is a diagram for explaining an operation of the packet fluctuation absorbing method and apparatus of the present embodiment when the control process of FIG. 9 is performed.

FIG. 13 shows an operation of the packet fluctuation absorbing method and apparatus of the present embodiment when the control process of FIG. 9 is performed.

As shown in FIG. 13, at the time instant T5, it is assumed that eight packets are received at the packet input unit 30 at the same time, and the IP number is 8. Suppose that the number of the retained packets (the RP number) at the input of the buffer 32 is 26, which is above the upper level (UL) of the buffer 32, and the DP ratio is set to 1/2. The IPAM 34 receives the RP number from the buffer 32 when receiving the information from the packet input unit 30. The IPSD 36 determines that the RP number is above the upper limit (UL) of the buffer 32. The IPSD 36 initiates the OFP 40. The OFP 40 requests the DPE 41 to receive the DP ratio from the DRST 65. Further, the OFP 40 requests the DPE 41 to extract the excessive packets from among the received packets in the packet input unit 30 in accordance with the DP ratio. The DPE 41 extracts the excessive packets from among the received packets in accordance with the DP ratio of the request, and sends the discard request to the PDU 42. The PDU 42 discards the excessive packets of the read packets of the buffer 32 in accordance with the content of the discard request.

According to the present embodiment, it is possible to minimize the discarding of the successive packets at the time of the overflow of the buffer 32 and avoid large fluctuations of data at the time of the reproduction at the receiver.

The present invention is not limited to the above-described embodiments, and variations and modifications may be made without departing from the scope of the present invention.

Further, the present invention is based on Japanese priority application No. 2000-243333, filed on Aug. 10, 2000, the entire contents of which are hereby incorporated by reference.

What is claimed is:

1. A packet fluctuation absorbing method comprising the steps of:

receiving packets from a preceding node of a network;

temporarily retaining the packets in a buffer;

reading the respective packets from the buffer, in the order of receiving of the packets, at given time instants;

outputting the read packets to a following node of the network so as to absorb time-related fluctuations of the packets;

storing a lower limit of the buffer that is predetermined as being larger than zero; and discarding, when the number of retained packets in the buffer is less than the stored lower limit as a result of the outputting of one of the read packets and a use count of the corresponding one of the read packets is equal to or larger than a predetermined use count upper limit, the corresponding packet in the retained packets of the buffer.

2. The packet fluctuation absorbing method according to claim 1, further comprising the step of discarding, when the number of retained packets in the buffer is above the stored lower limit as a result of the inputting of one of the received packets and a use count of the corresponding one of the received packets is not equal to zero, the corresponding packet in the received packets in the buffer.

3. The packet fluctuation absorbing method according to claim 1, further comprising the steps of:

storing an upper limit of the buffer that is predetermined as being smaller than a maximum level of the buffer; and discarding, when the number of retained packets in the buffer exceeds the stored upper limit as a result of the outputting of one of the read packets, the corresponding packet in the retained packets of the buffer in accordance with a predetermined discard packet ratio.

4. The packet fluctuation absorbing method according to claim 3, further comprising the steps of:

storing an optimum value of the buffer that is predetermined as being between the lower limit and the upper limit; and discarding, when the number of retained packets in the buffer is less than or equal to the stored optimum value as a result of the outputting of one of the read packets, the corresponding packet in the retained packets of the buffer.

5. A packet fluctuation absorbing apparatus comprising:

a packet input unit receiving packets from a preceding node of a network;

a buffer temporarily retaining the received packets;

a packet output unit reading the respective packets from the buffer, in the order of receiving of the packets, at given time instants and outputting the read packets to a following node of the network so as to absorb time-related fluctuations of the packets;

a lower limit storing unit storing a lower limit of the buffer that is predetermined as being larger than zero; and a first discarding unit discarding, when the number of retained packets in the buffer is less than the stored lower limit as a result of the outputting of one of the read packets and a use count of the corresponding one of the read packets is equal to or larger than a predetermined use count upper limit, the corresponding packet in the retained packets of the buffer.

6. The packet fluctuation absorbing apparatus according to claim 5, further comprising a second discarding unit discarding, when the number of retained packets in the buffer is above the stored lower limit as a result of the inputting of one of the received packets and a use count of the corresponding one of the received packets is not equal to zero, the corresponding packet in the received packets in the buffer.

7. The packet fluctuation absorbing apparatus according to claim 6, further comprising:

an upper limit storing unit storing an upper limit of the buffer that is predetermined as being smaller than a maximum level of the buffer; and a third discarding unit discarding, when the number of retained packets in the buffer exceeds the stored upper limit as a result of the outputting of one of the read packets, the corresponding packet in the retained packets of the buffer in accordance with a predetermined discard packet ratio.

8. The packet fluctuation absorbing apparatus according to claim 7, further comprising:

an optimum value storing unit storing an optimum value of the buffer that is predetermined as being between the lower limit and the upper limit; and a fourth discarding unit discarding, when the number of retained packets in the buffer is less than or equal to the stored optimum value as a result of the outputting of one of the read packets, the corresponding packet in the retained packets of the buffer.

9. The packet fluctuation absorbing apparatus according to claim 7, further comprising:

a packet identifying unit detecting whether each of the received packets is valid or invalid, and adding a valid/invalid indication to a header portion of each of the received packets; and a fifth discarding unit discarding, when the number of retained packets in the buffer exceeds the stored upper limit as a result of the inputting of one of the received packets and the corresponding packet is detected as being invalid, the corresponding packet of the received packets in the buffer.

10. The packet fluctuation absorbing apparatus according to claim 7, further comprising:

a discarding unit discarding, when the number of retained packets in the buffer exceeds the stored upper limit as a result of the inputting of one of the received packets, a corresponding packet in the retained packets of the buffer in accordance with a predetermined discard packet ratio.

* * * * *